United States Patent
Kibel

(10) Patent No.: US 8,240,941 B2
(45) Date of Patent: Aug. 14, 2012

(54) FLEXURE WITH ELONGATED OPENINGS

(75) Inventor: Edmond Kibel, Placitas, NM (US)

(73) Assignee: Exelis Inc., McLean, VA (US)

( * ) Notice: Subject to any disclaimer, the term of this patent is extended or adjusted under 35 U.S.C. 154(b) by 445 days.

(21) Appl. No.: 12/210,457

(22) Filed: Sep. 15, 2008

(65) Prior Publication Data

US 2010/0067980 A1    Mar. 18, 2010

(51) Int. Cl.
*F16C 11/12*    (2006.01)
(52) U.S. Cl. ........................................ 403/220; 403/291
(58) Field of Classification Search .................... 403/53, 403/57, 58, 220, 291; 16/225, 226, 227; 248/479, 485, 486, 487
See application file for complete search history.

(56) References Cited

U.S. PATENT DOCUMENTS

| | | | |
|---|---|---|---|
| 2,937,053 A | 5/1960 | Rigney | |
| 3,217,536 A | 11/1965 | Motsinger et al. | |
| 3,384,424 A | 5/1968 | Raines | |
| 3,420,582 A * | 1/1969 | Shelley | 403/291 |
| 3,597,938 A * | 8/1971 | Hellen et al. | 403/291 |
| 3,700,290 A | 10/1972 | Ensinger | |
| 3,700,291 A | 10/1972 | Hadland | |
| 4,100,813 A | 7/1978 | Previte | |
| 4,143,451 A * | 3/1979 | Craig et al. | 403/291 |
| 4,286,370 A * | 9/1981 | Craig | 403/291 |
| 4,528,864 A | 7/1985 | Craig | |
| 6,094,288 A | 7/2000 | Tamburrini | |
| 6,479,782 B1 * | 11/2002 | Blackburn | 219/69.17 |
| 2009/0016810 A1 | 1/2009 | Geiger et al. | |

FOREIGN PATENT DOCUMENTS

| | | |
|---|---|---|
| EP | 1013949 | 6/2000 |
| GB | 1538805 | 1/1979 |

OTHER PUBLICATIONS

Extended European Search Report in counterpart Application No. EP 09169959.5, dated Dec. 11, 2009.

* cited by examiner

*Primary Examiner* — Michael P Ferguson
(74) *Attorney, Agent, or Firm* — Edell, Shapiro & Finnan, LLC

(57) ABSTRACT

A flexure for tilting having a neck which lies between a pair of cylindrical openings, each of which has a cross-sectional shape which is curved and elongated. A gimbal capable of tilting around mutually perpendicular axes which incorporates the flexure.

5 Claims, 7 Drawing Sheets

FLEXURE WITH ELONGATED OPENINGS

GOVERNMENT LICENSE RIGHTS

This invention was made with the support of the U.S. Government, and the U.S. Government has certain rights in the invention.

FIELD OF THE INVENTION

The present invention is directed to a flexure for performing a tilting function, and particularly to such a flexure which has a neck which lies between a pair of openings.

BACKGROUND

Flexures are well-known in the art, and may be used for positional adjustment of optical elements or devices as well as for performing light scanning, steering, or switching operations. Flexures have a variety of other uses also including holding test instruments or objects being tested.

The maximum tilt angle of a flexure may be limited by the tendency of the flexure to yield when tilted too far. A flexure is said to "yield" when it no longer returns to its original position after being tilted, i.e., when it begins to deform plastically rather than elastically.

In a prior flexure design, a neck around which the device pivots is situated in a block of elastic material between a pair of cylindrical openings of circular cross-section. It was found that the usefulness of the flexure was limited because yielding occurred before the required tilt angle was reached. It was still more difficult to use such a flexure for active applications such as scanning where fatigue was a factor.

SUMMARY

In accordance with the present invention, a flexure is provided having a neck which lies between a pair of cylindrical openings, each of which has a cross-sectional shape which is curved and elongated.

The yield characteristic of the flexure is improved, and it may be operated over greater tilt angles without the occurrence of yielding.

DETAILED DESCRIPTION

Figure 1:
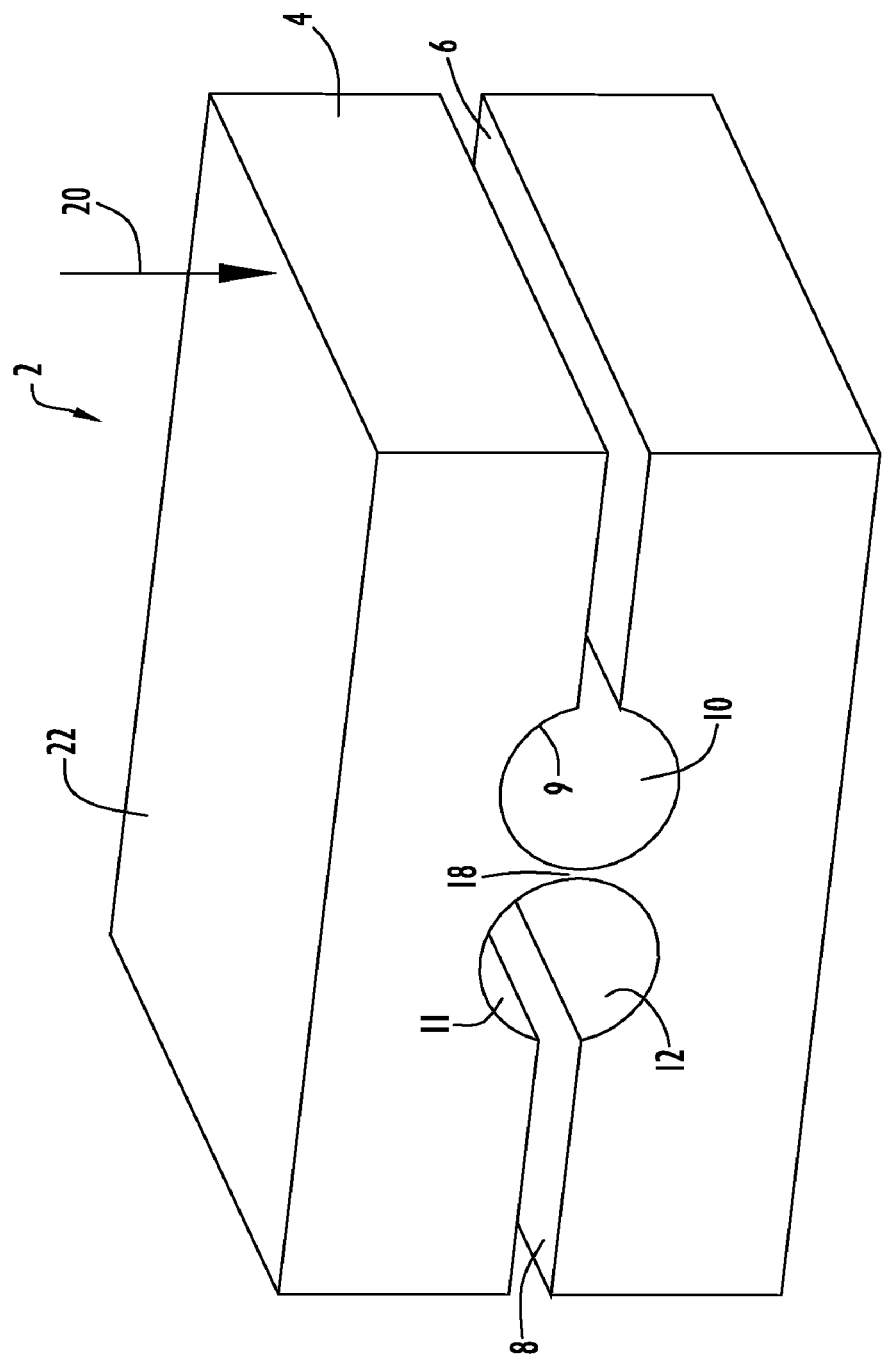
FIG. 1 shows a prior art flexure which has openings of circular cross-sectional shape.

Referring to FIG. 1, a flexure 2 of the prior art is shown. The flexure is ordinarily made out of a single block of elastic material 4, which may be a metal. In the embodiment of FIG. 1, the shape of the block is rectangular. The block is cut in such a way as to form a pair of slits 6 and 8. The interior ends of the slits form entrances to respective cylindrical openings 10 and 12 which are formed by cylindrical walls 9 and 11. The cylindrical openings pass completely through the block from front to back in FIG. 1, and have a cross-sectional shape having a boundary which is a circular curve. A neck 18 lies between openings 10 and 12, and when a force, depicted by arrow 20 in FIG. 1 is applied to the flexure it pivots around neck 18 and tilts.

The flexure may be used in various applications. For example, surface 22 may bear a mirror, and the flexure may be used for positional adjustment of the mirror, or in an active application such as scanning the mirror. A difficulty with the prior art flexure of FIG. 1 is that the requirement to prevent yielding of the high stress area in the neck limits by too much the degree of tilting which is available.

Figure 2:
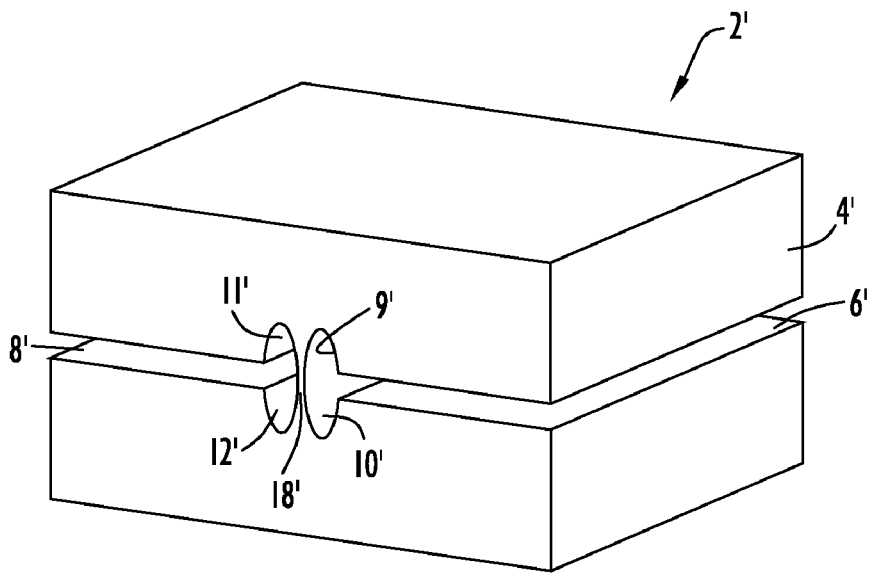
FIGS. 2 and 3 show a flexure in accordance with an embodiment of invention which has openings of curved and elongated cross-sectional shape.
Figure 3:
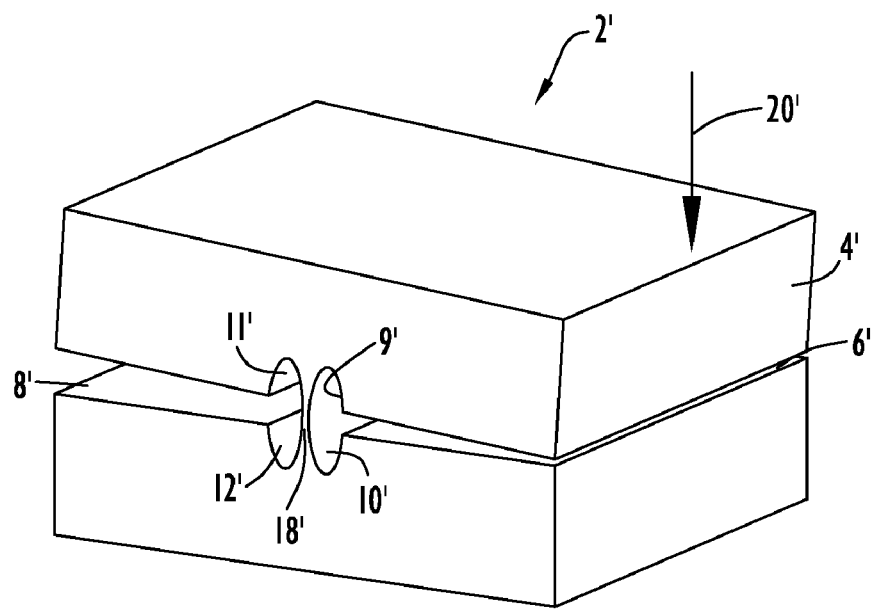

An embodiment of the invention is depicted in FIGS. 2 and 3, wherein primed reference numerals which correspond with the reference numerals of FIG. 1 are used to identify like parts. Referring to FIGS. 2 and 3, flexure 2' is shown which is made from block 4' of elastic material. First and second slits 6' and 8' are present in the block, and the interior ends of the respective slits form entrances to first and second cylindrical openings 10' and 12' which are formed by cylindrical walls 9' and 11'. However, unlike in the prior art embodiment of FIG. 1, the cross-sectional shape of cylindrical openings 10' and 12' has a boundary which is curved and elongated rather than circular. It is noted that the term "cylindrical" is used herein in its general sense to include non-circular cylinders and those having cross-sectional boundary shapes which are not completely closed. Openings 10' and 12' pass through the block from front to back, and neck 18' lies between the openings. Referring to FIG. 3, it will be observed that when a force depicted by arrow 20' is applied, the flexure tilts around a pivot region in neck 18'.

Figure 4:
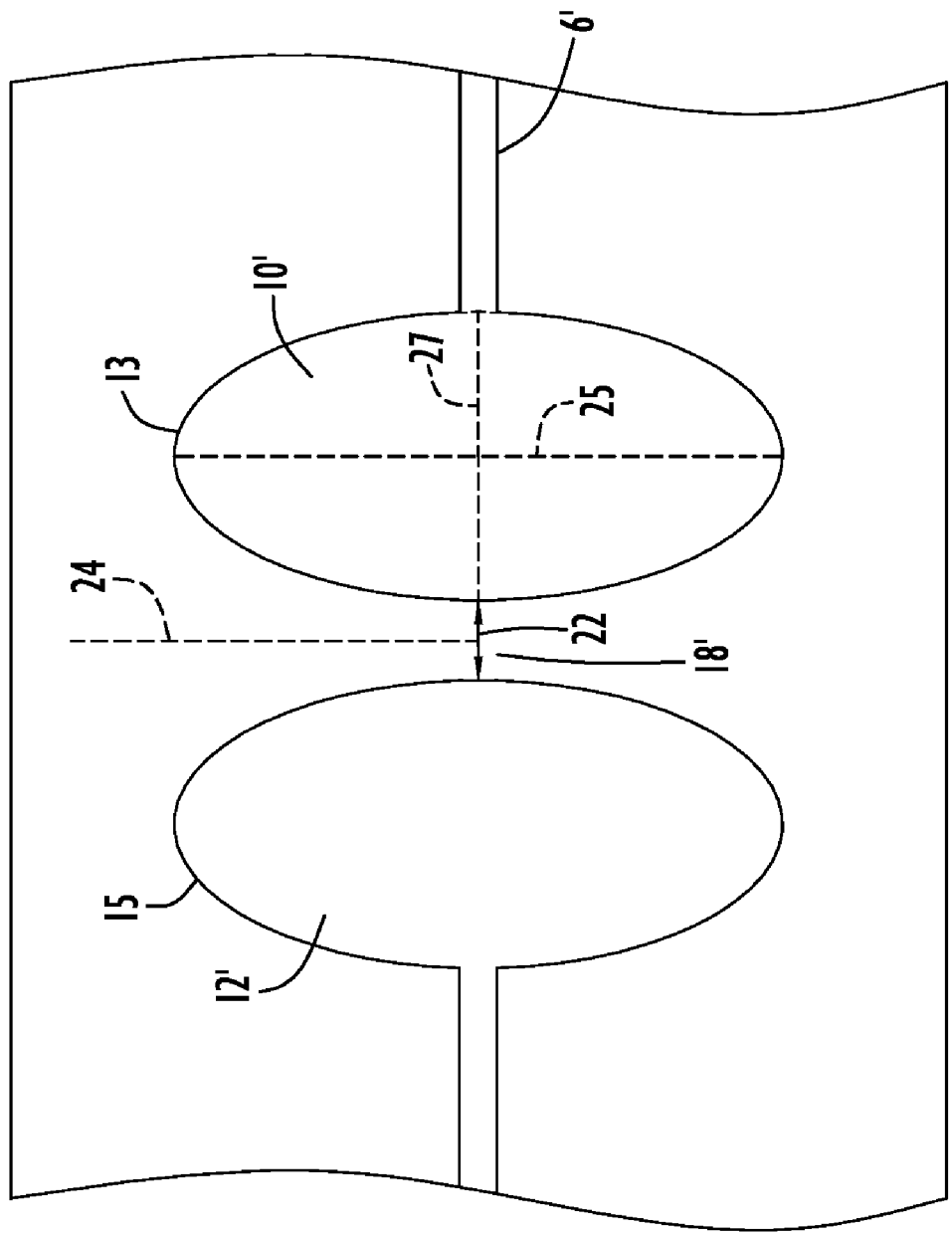
FIG. 4 shows an enlarged front view of FIG. 2 with directional indications

FIG. 4 is an enlarged front view of part of the flexure which illustrates the orientation of elongated openings 10' and 12'. The shortest dimension of neck 18' extends directly between the two openings at the narrowest region of the neck, and is depicted by line 22. The long dimension of the neck is transverse to the shortest dimension, and is represented by line 24. The cross-sectional shape of openings 10' and 12' has boundaries 13 and 15 respectively which are elongated in a direction parallel to the long dimension of the neck. The term "elongated" as used herein means that the longest dimension of the boundary in a direction parallel to the long dimension of the neck is at least 1.25 times as great as the short dimension of the boundary which is perpendicular to and which bisects the longest dimension. These dimensions are depicted by lines 25 and 27 in FIG. 4. It is noted that the term "boundary" as used herein includes a line which follows the boundary curve and makes a connection across the slit.

The boundary may be an elliptical or parabolic curve, although if the flexure is small, parabolic openings may be difficult to make. Openings of elliptical cross-section have an eccentricity of greater than 0.69 and less than 0.96 for best results.

A test comparing the embodiment of FIGS. 2 and 3 with the prior art design of FIG. 1 illustrates the advantages of the invention. In the example below, the FIG. 1 flexure is machined out of aluminum block 2.0"×2.0"×1.0" thick with two 0.375" openings of circular cross-section 0.014" apart at the narrowest point. The block is slitted horizontally 0.080" wide to provide rotation. A minimum deflection of 0.040" at the tip is desired, which results in a 2.3° rotation. However, when the stress is just under 35k psi, the deflection is only 0.0267". The yield stress for 6061-T6 aluminum is 35k psi. Thus, in order to achieve the deflection desired the force would have to be increased, resulting in yielding of the flexure. Changing to other materials such as various steels or titanium does not affect the results by much. While these other materials have higher yield stresses, they also have higher modulus' of elasticity, which tend to offset each other.

In the flexure according to the embodiment of FIGS. 2 and 3 the overall dimensions and material is the same as in the case of the FIG. 1 unit, but two openings of elliptical cross-section of dimensions 0.375"×0.12" which are 0.014" apart at the narrowest part of the neck are utilized. In both cases, a load of 2 pounds was applied to the flexure. The table below summarizes the results obtained from the test.

|  | FIG. 1 | FIG. 2 |
|---|---|---|
| Stress (psi) | 34350 | 29230 |
| Deflection (in.) | .0267 | .04356 |

As can be seen from the table, the stress in the neck in the case of the FIG. 1 design is just about yielding and the deflection is only 0.0267", whereas 0.040" is required. To achieve the desired deflection, the flexure would definitely yield. On the other hand, the stress in the neck in the case of the FIG. 2 embodiment is only 29230 PSI and the desired deflection of 0.040" has been exceeded. Thus, much better results are achieved with use of the invention.

The invention may be used in electro-optical systems having a requirement for large deflection angles or where continuous or repeated operation such as scanning is required. Also, the force applied to the flexure to achieve tilting may be of various types including but not limited to mechanical, electric actuator, magnetic, electromagnetic, or pneumatic. It is further noted that while the flexure of the preferred embodiment of the invention includes two slits per elongated opening, it may possible to use a flexure having one slit per opening in some applications. The use of the invention is not limited to electro-optical systems as it may be used in various types of systems where tilting is required.

Figure 5:
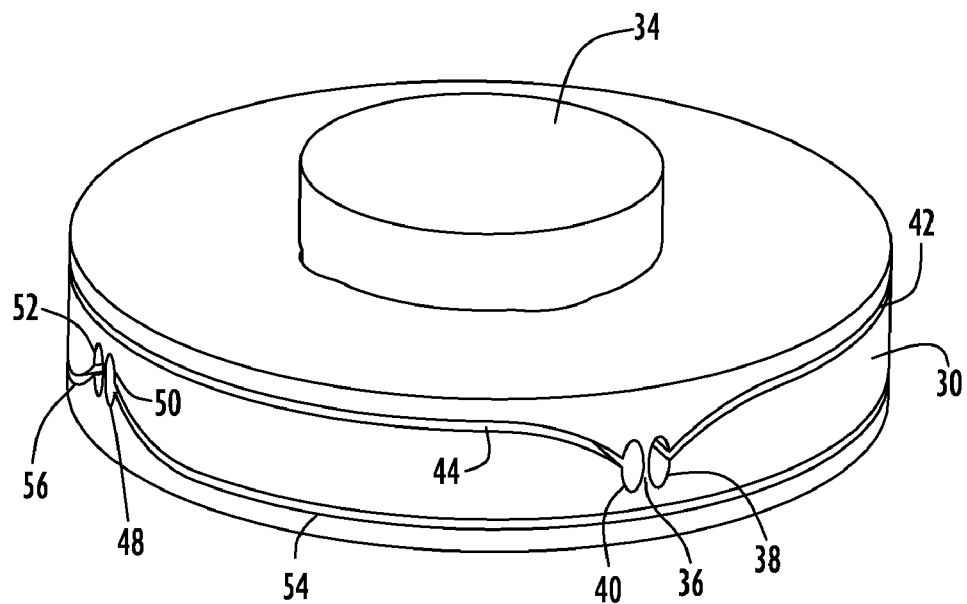
FIGS. 5 and 6 show an embodiment of the invention used as a gimbal, which pivots around mutually perpendicular axes.
Figure 6:
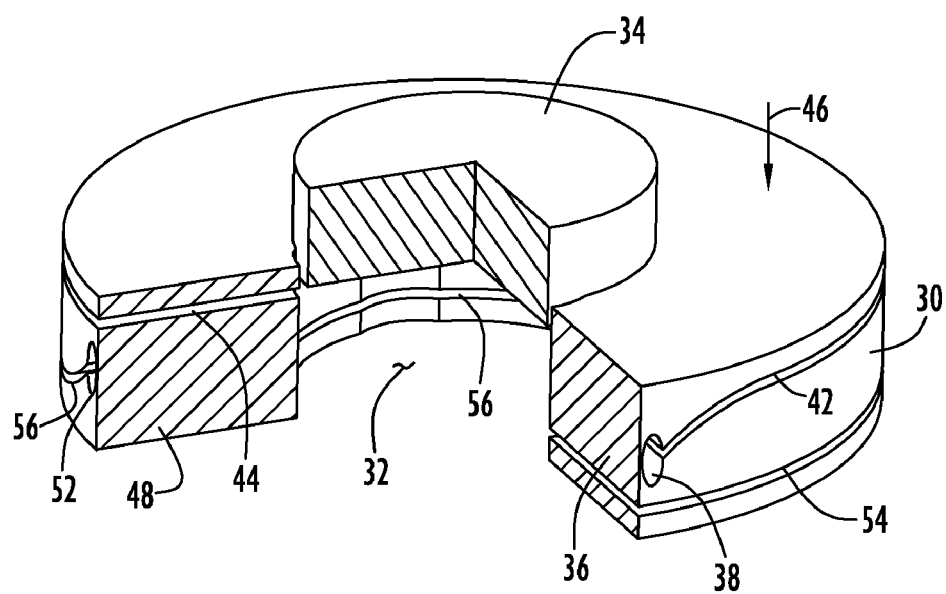

Referring to FIGS. 5 and 6, a further embodiment of the invention is shown where the layout of the flexure is annular rather than rectangular. Such a flexure may be in the nature of a gimbal which provides a compound tilt angle adjustment in mutually perpendicular directions. By way of an example, such a flexure may be used to provide a precision adjustment of optical elements such as laser end mirrors.

Referring to FIG. 6, it will be seen that block 30 has a cross-section which is annular in shape. Cavity 32 is surrounded by the annular block, and mirror 34 may be mounted, for example, by recessing it in the cavity. Referring to FIG. 5, neck 36 lies between cylindrical openings 38 and 40, and in accordance with the invention, these openings have a cross-sectional shape which is curved and elongated.

Referring to FIG. 6, a section of neck 36 is shown. There is another neck lying between a second pair of openings 180° displaced from neck 36 (not shown). Additionally, slit 42 connects opening 38 with an opening of the second pair of openings while slit 44 connects opening 40 with the other opening of the second pair of openings. The slits are cut all the way through the annular block as are the openings, so when a force 46 is applied 90° displaced from neck 36, the flexure pivots around both necks and tilts.

A further neck 48 is shown 90° displaced from neck 36, which lies between openings 50 and 52. There is a similar neck and pair of openings 180° displaced from neck 48 (not shown), and slits 54 and 56 connect openings of the respective pairs to each other. This allows tilting of the flexure around neck 48 and its counterpart halfway around the device.

It is noted that the respective pairs of openings 38, 40 and 50, 52 as well as their respective counterparts halfway around the device lie in the same plane, so that a true gimballing action is attained. This requires the slits to be cut in a complex shape, is shown in FIGS. 5 and 6. However, there is a common plane which passes through most of the dimensional area of both slits leading to any pair of openings having the same neck therebetween. It is also possible to stack the pivot axes rather than to intersect them, but in such an embodiment a true gimbal is not provided.

Figure 7:
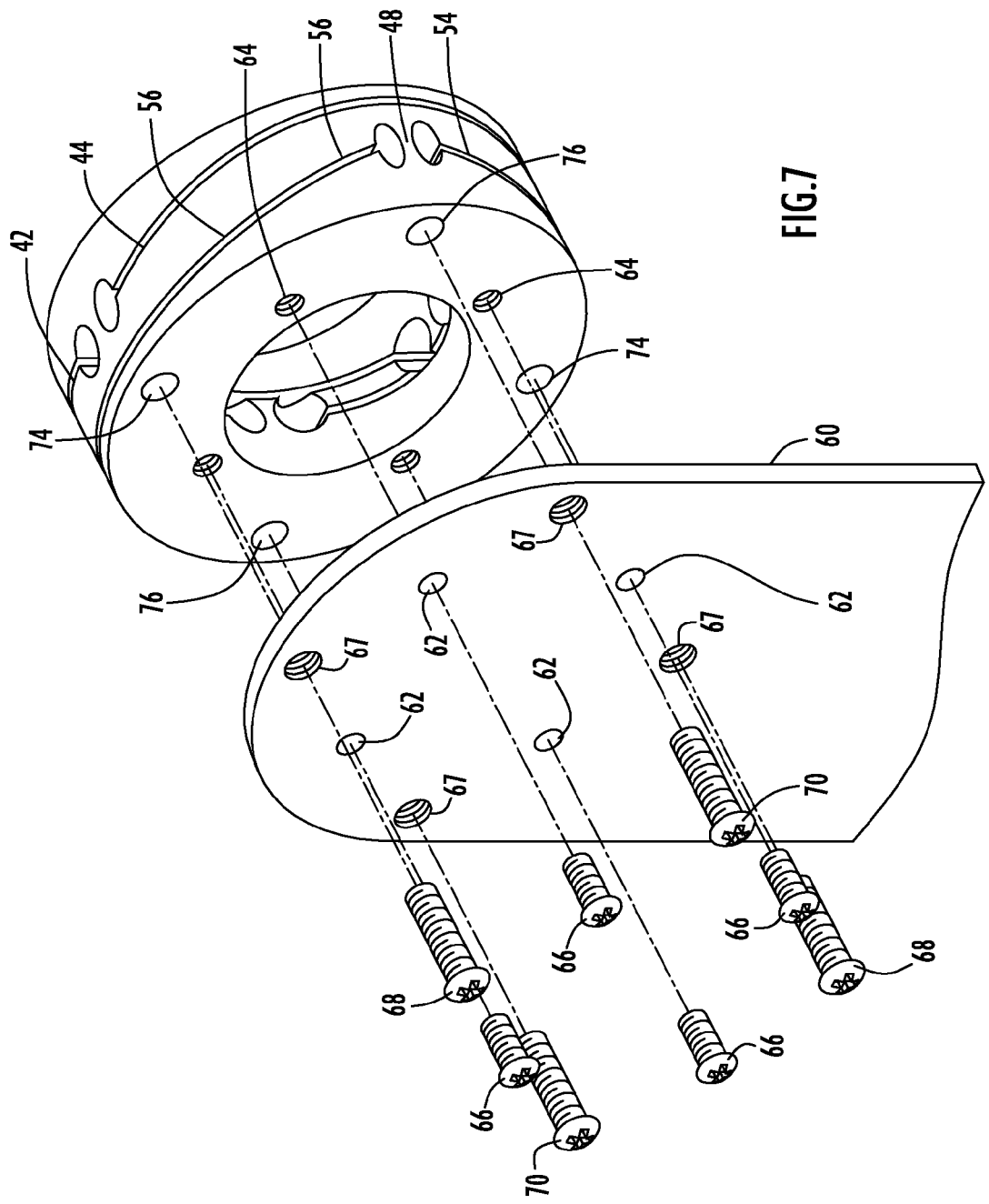
FIGS. 7 to 9 show how the embodiment of FIGS. 5 and 6 may be mounted, and how tilting adjustments may be made.
Figure 8:
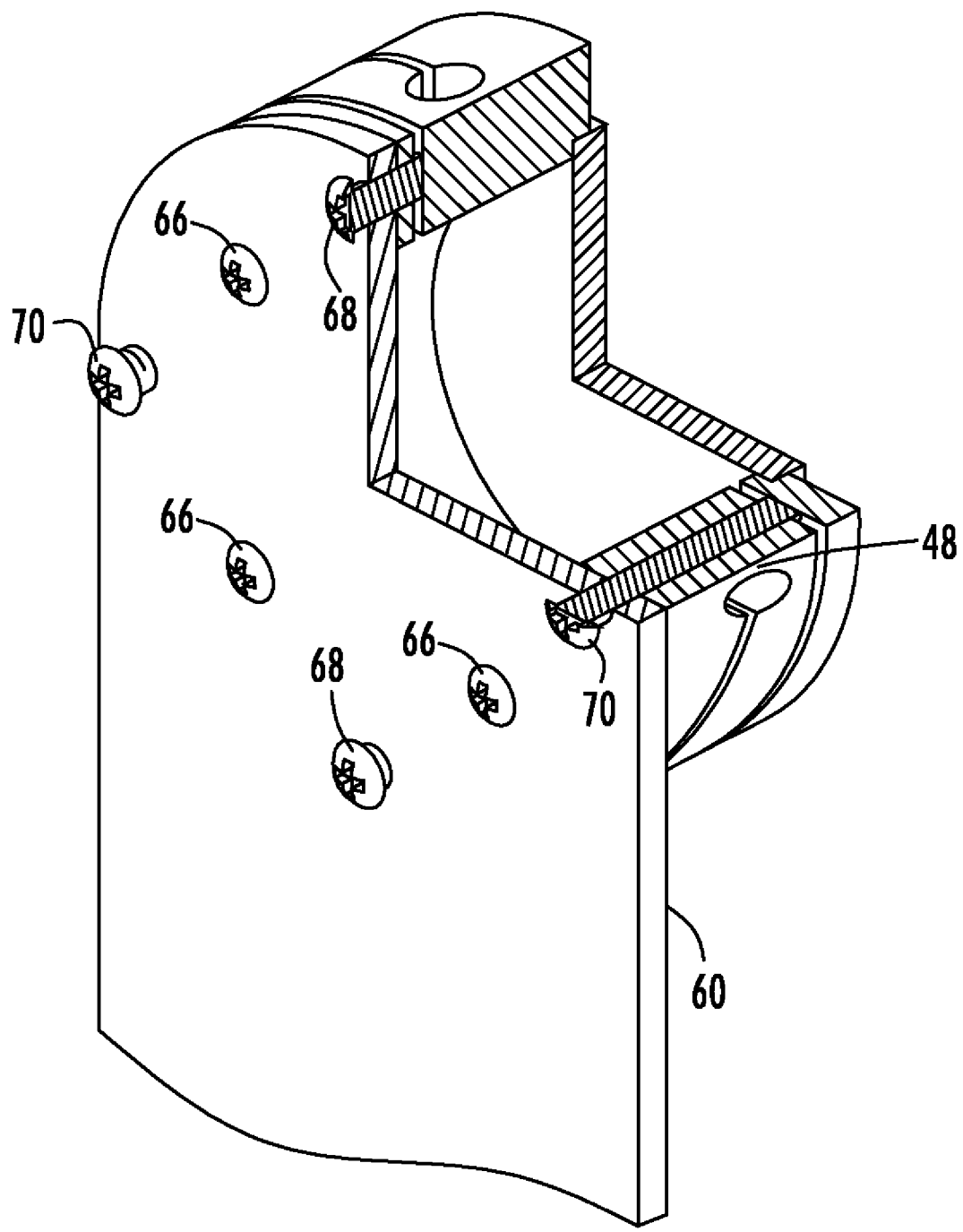
Figure 9:
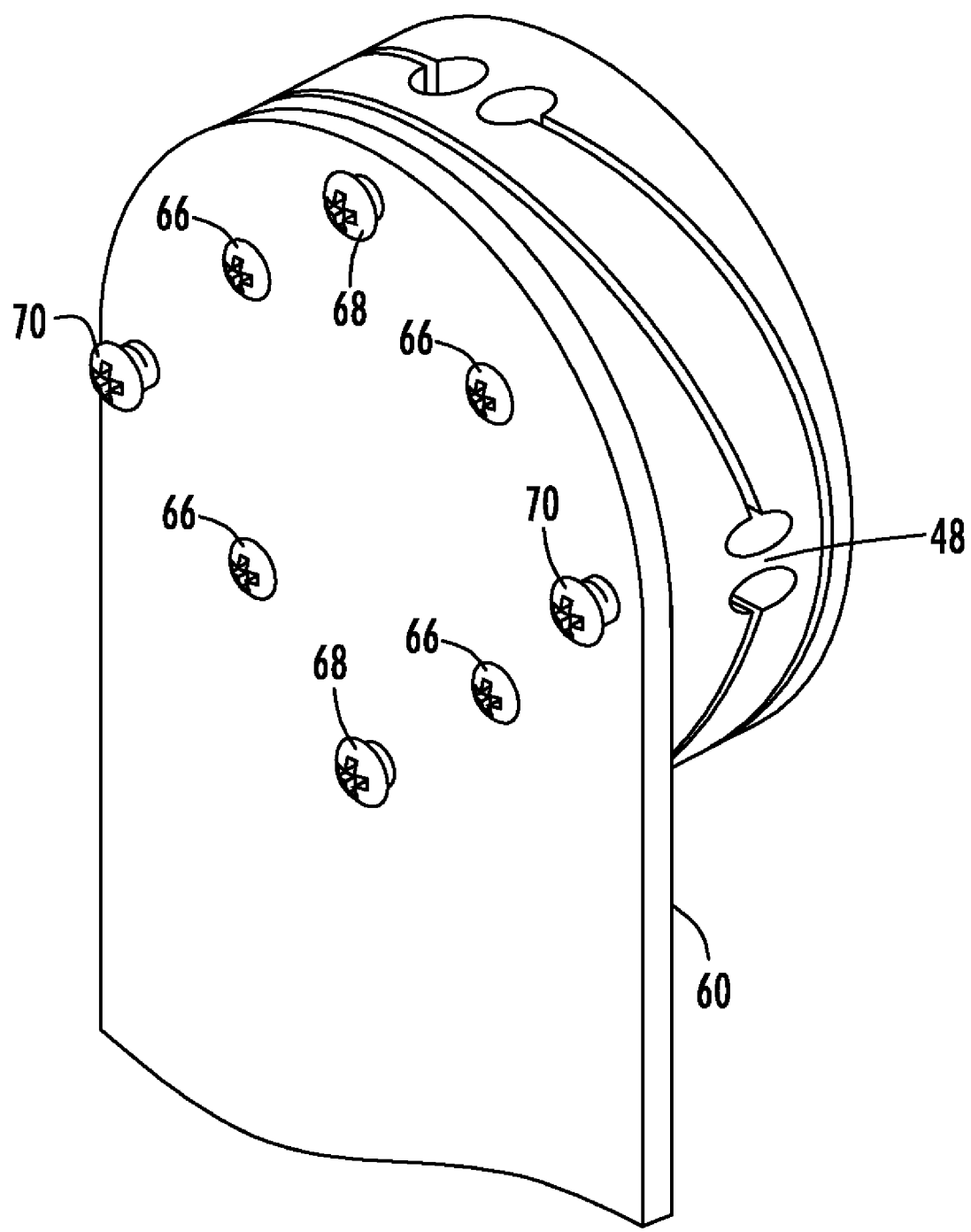

Referring to FIGS. 7 to 9, an approach to mounting the gimbal of FIGS. 5 and 6 is depicted, as well as of providing adjustment of the compound tilt angle. In FIG. 7, mounting plate 60 is shown, which has mounting holes 62. There are corresponding holes 64 in the flexure which are threaded, and screws 66 are used to secure the flexure to the mounting plate. The mounting plate also includes threaded holes 67 through which adjustment screws 68 and 70 pass. Adjustment holes 74 and 76, which are clearance holes, are provided in the flexure, and screws 68 and 70 pass through these holes to provide tilt angle adjustment.

For example, screws 68 provide adjustment around the axis of neck 48. Holes 74 are drilled deep enough to traverse slits 54 and 56, and one of the screws 68 may be tightened while the other is in the unscrewed state until the desired tilt angle is reached. At that point, the other of the screw is screwed in just enough to touch the contact surface, so as to retain the flexure in place at the desired tilt angle.

Holes 76 are drilled deep enough to penetrate slits 42 and 44, and screws 70 may be used to adjust the flexure around the axis of the necks which are 90° displaced from neck 48. FIG. 8 depicts the flexure as mounted on the mounting plate 60, and is partially cut away to show the depths to which the adjustment screws penetrate. FIG. 9 depicts the flexure as it appears when mounted.

The flexure of the present invention may be made from a block of metal by an electric discharge method. In one such procedure, a consumable wire is used, which may be computer controlled to generate the correct shape. In another method, an electrode which is pre-formed in the shape of the desired design may be utilized. It also may be possible to make the design by drilling, sawing, and milling operations.

There thus has been described an improved flexure for providing a tilting function. While the invention has been described in connection with illustrative embodiments, it is understood that variations will occur to those skilled in the art, and the invention is to be limited only by the claims appended hereto and equivalents.

What is claimed is:

1. A flexure for tiltably mounting an object to a support surface, comprising:
   a block of elastic material having mounting surfaces at opposing longitudinal ends thereof which extend transverse to a longitudinal axis of the block, the block having first and second cylindrical openings therein with a neck therebetween, each of said openings having a length dimension extending completely through said block in an axial direction transverse to the longitudinal axis,
   first and second slits in the block, each extending along a sidewall surface of said block and to a respective one of said openings and extending completely through said block in an axial direction transverse to the longitudinal axis, wherein said first slit at an end forms an entrance to said first cylindrical opening and said second slit at an end forms an entrance to said second cylindrical opening, said neck having a shortest dimension extending directly between said openings at the narrowest region of the neck and a long dimension which is transverse to the shortest dimension, each of said first and second cylindrical openings having a cross-sectional shape transverse to said axial direction which is elliptical with an eccentricity of greater than 0.69 and less than 0.96 and which is elongated in a direction which is parallel to said long dimension of the neck, wherein when said mounting surfaces are displaced relative to each other, tilting can occur around said neck while voids formed by the slits are utilized for accommodating the tilting movement.

2. The flexure of claim 1 wherein said first and second cylindrical openings are of the same size.

3. The flexure of 1 wherein said entrances to said first and second cylindrical openings are directly opposite said neck.

4. The flexure of claim 1, wherein said block of elastic material has an annular cross-section shape and wherein said axial direction is a radial direction of the annular shape, further including third and fourth cylindrical openings in the block extending completely through the block in a radial direction having a second neck therebetween, there being third and fourth slits in the block, each extending along a sidewall surface of said block and to a respective one of said third and fourth openings and extending completely through said block, said third slit at a slit end forming an entrance to said third cylindrical opening, said fourth slit at a slit end forming an entrance to said fourth cylindrical opening, said second neck having a shortest dimension extending directly between said third and fourth cylindrical openings at the narrowest region of the second neck and a long dimension which is transverse to said shortest dimension, each of said third and fourth cylindrical openings having a cross-sectional shape in a plane transverse to said radial direction which is elliptical with an eccentricity of greater than 0.69 and less than 0.96 and which is elongated in a direction which is parallel to the long dimension of the second neck.

5. The flexure of claim 1 in combination with means for applying a force to a surface of the flexure for causing it to tilt.

* * * * *

UNITED STATES PATENT AND TRADEMARK OFFICE
CERTIFICATE OF CORRECTION

| | | |
|---|---|---|
| PATENT NO. | : 8,240,941 B2 | Page 1 of 1 |
| APPLICATION NO. | : 12/210457 | |
| DATED | : August 14, 2012 | |
| INVENTOR(S) | : Edmond Kibel | |

It is certified that error appears in the above-identified patent and that said Letters Patent is hereby corrected as shown below:

Column 5, line 14, replace "of 1" with -- of claim 1 --.

Signed and Sealed this
Sixth Day of November, 2012

David J. Kappos
*Director of the United States Patent and Trademark Office*